No. 648,392. Patented May 1, 1900.
E. F. & W. B. COLLINS.
LUMBER MEASURER AND REGISTER.
(Application filed May 18, 1899.)
(No Model.)
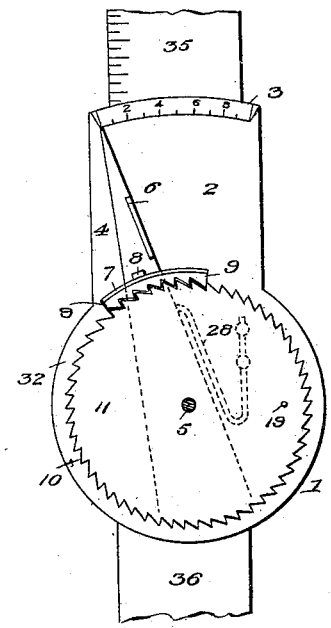
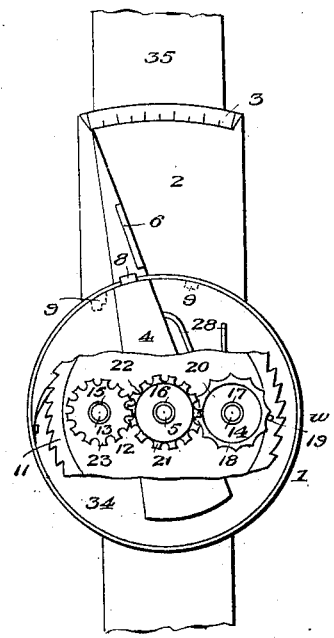
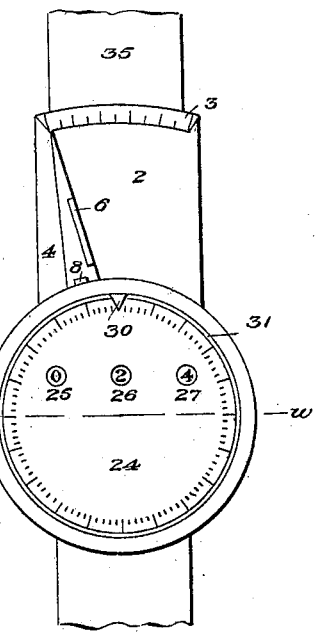
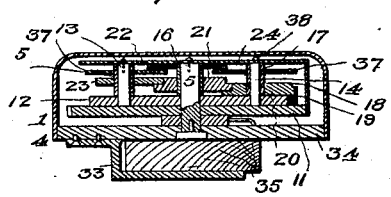
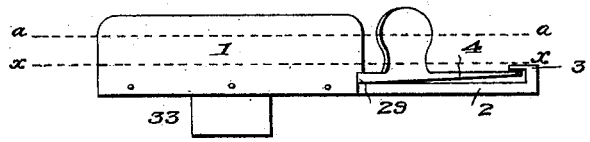
Witnesses:
Inventors
E. F. Collins
W. B. Collins

UNITED STATES PATENT OFFICE.

EMERY F. COLLINS, OF WHEELING, AND WILLIAM B. COLLINS, OF PARKERSBURG, WEST VIRGINIA.

LUMBER MEASURER AND REGISTER.

SPECIFICATION forming part of Letters Patent No. 648,392, dated May 1, 1900.

Application filed May 18, 1899. Serial No. 717,374. (No model.)

*To all whom it may concern:*

Be it known that we, EMERY F. COLLINS, residing at Wheeling, in the county of Ohio, and WILLIAM B. COLLINS, residing at Parkersburg, in the county of Wood, State of West Virginia, citizens of the United States of America, have invented certain new and useful Improvements in Lumber Measures and Registers, of which the following is a specification.

Our invention relates to registering devices, and is especially adapted to be used in connection with a lumber rule or measure to register the amount of lumber measured; and it consists in certain novel constructions, combinations, and arrangements of parts, which will be hereinafter described, and pointed out in the claims.

The invention has for its object to construct a registering device which may be conveniently attached to a lumber rule or measure and which will register the amount of lumber measured, the operator, as each piece is measured, simply moving a hand or pointer provided thereon along a graduated scale provided thereon to the number corresponding to the number of feet measured.

The invention has also for its object to provide a device of the character mentioned which may be conveniently and quickly operated and which will register accurately up to one hundred thousand.

Reference is had to the accompanying drawings, in which—

Figure 1 represents a horizontal transverse sectional view of our invention on the line *x x* of Fig. 5 looking toward the base thereof. Fig. 2 is a similar view on the line *a a* of Fig. 5, parts of the large rotatable disk and stationary plate being cut away to show the bottom portion. Fig. 3 is a top plan view of the device complete. Fig. 4 is a vertical transverse sectional view of the same on the line *w w* of Fig. 3. Fig. 5 is a side elevation of the same.

Referring to the drawings, in which similar reference-numerals indicate similar parts in the several figures, 1 represents the casing which incloses the registering mechanism. 2 is an extension of the bottom or base plate of the device. Said extension has an upward and backward bend at its forward end, as is clearly shown in Fig. 5. A graduated scale 3 is provided upon the top of the backward bend. Said bend is also intended to serve as a protector for the point of the hand or pointer 4. The hand or pointer 4 has fixed thereon outside the circular or box portion of the device an upwardly-extending ear or thumbpiece 6. In order to allow of a free movement of the hand or pointer 4 from left to right and from right to left in the slot 29, (see Fig. 5,) said hand or pointer is loosely pivoted upon the vertical post or axis 5, which projects upward from the center of the circular or box portion of the device.

Just inside the casing 1 is an arc-shaped spring 7, rigidly secured at its center to the hand or pointer 4 at 8 and having at each end a ratchet tooth or pawl 9, adapted to engage the notches 10 in a circular notched or ratchet-toothed rotatable disk 11, which is loosely mounted at its center upon the post or axis 5 above the body or base portion of the hand or pointer 4, as is clearly shown in Fig. 1. Said disk 11 is provided with an even one hundred notches or ratchet-teeth.

Above the disk 11 is a stationary plate 12, which is rigidly secured to the post or axis 5. This plate 12 supports two upright posts or axes 13 and 14. Each of said upright posts or axes 13 and 14 and the upright post or axis 5 is surrounded above the plate 12 by a sleeve 15, 16, and 17 respectively, which revolves thereon.

Rigidly secured upon the sleeve 17 is a small wheel or disk 18, having ten cogs or teeth designed to be engaged by a small stud or post 19, which is carried by the rotatable disk 11, each time said rotatable disk 11 shall have made one complete revolution. Directly above the wheel or disk 18 and rigidly secured upon the sleeve 17 is a small wheel or disk 20, having but one cog or tooth. Said tooth is designed to engage successively the cogs or teeth on a small ten-toothed wheel or disk 21, which is rigidly secured upon the rotatable sleeve 16, each time the wheel or disk 18 shall have made one complete revolution. Directly above the wheel or disk 21 is a small wheel or disk 22, having but one cog or tooth. Said tooth is designed to engage successively the cogs or teeth on a small ten-toothed wheel or disk 23, which is rigidly secured upon the rotatable sleeve 15, each time the wheel or disk 22 shall have made one complete revolution.

Rigidly secured upon each of the sleeves 15, 16, and 17 and above the wheels 23, 22, and 20 is a small circular disk or dial, each having distributed around the edge of its upper face at regular intervals the figures "0" "1" "2" "3" and so on up to and including "9." These dials 37 are each independent of the others. Above these dials 37 is secured a stationary face or large registering-dial 24, provided around its edge with a graduated scale with one hundred degrees or spaces. This dial 24 is also provided with three small openings 25, 26, and 27 in its face, through which the numbers on the disks or dials 37 show as registered.

Secured at one end to the bottom or base plate 34 and inside the casing 1 is a small bent spring 28, the free end of which presses against the side of the hand or pointer 4 and is designed to actuate said hand or pointer to return to its normal position when released after it has been moved forward in registering.

Upon the edge of the large notched or ratchet-toothed rotatable disk 11 is secured a pointer or indicator 30, which projects upward from said disk through the slot 31 and outward over the edge of the dial 24. The slot 31 is an endless slot in the edge of the face of the device, in which the indicator 30 moves as the rotatable disk 11 is turned.

The graduated scale on the end of the extension 2 is numbered up to "10."

The face of the circular or box portion of the device is covered with a glass case 38, which is fitted into the edge of the rim of the casing 1.

The whole device is designed to be secured or attached upon a lumber rule or measure 35 by any suitable means, the means used in the present instance being simply an L-shaped clip 33, secured at one end to the base-plate 34 of the circular or box portion of the device.

The end 36 of the lumber measure or rule 35 is preferably shaped to form a handle, so that the registering device may be conveniently operated by the thumb of the hand which holds the rule.

Our invention operates as follows: Having measured a piece of lumber, the thumb is placed upon the thumb-piece 6 on the hand or pointer 4. The said hand or pointer is pushed to the right until its pointed end points to the number on the scale which corresponds with the number of feet of lumber in the piece measured. The hand or pointer in turning to the right carries with it, by means of the ratchets or pawls 9 on the arc-shaped spring 7, the circular or ratchet-toothed rotatable disk 11, which carries the indicator 30. Said indicator will point to the number on the face of the dial corresponding with that pointed to on the scale 3 by the hand or pointer 4. When the hand or pointer 4 is released, it is actuated to return to its normal position at "0" by means of the spring 28, the spring 7 allowing the ratchets or pawls 9 to slide over the teeth in returning. The disk 11 is held firmly and prevented from turning back or retrograding with the hand or pointer by means of the spring 32, which is secured at one end to the inner side of the casing 1 and has on its other end a ratchet or pawl which engages the teeth of the said disk when it starts to turn backward. This operation has only to be repeated each time a piece of lumber is measured, and the indicator 30 will point at all times to the number indicating the number of feet measured up to one hundred. When the one-hundredth foot is registered, the indicator will point to "0" on the dial 24. The stud or post 19 on the disk 11 will strike one of the points or teeth on the ten-toothed wheel or disk 18 and cause said wheel or disk to turn one-tenth of a revolution. This wheel or disk 18 being securely fixed to the sleeve 17, the sleeve will also turn, and with it the dial 37, provided thereon, will also turn one-tenth of a revolution and show at the opening 27 in the dial 24 the figure "1." It is apparent that the wheel or disk 18 will be turned one-tenth of a revolution each time one hundred feet or a multiple thereof is registered and that the dial 37 on the sleeve 17 will also at the same time be turned one-tenth of a revolution and will show at the opening 27 in the large dial 24 the number of hundred feet registered up to nine. When the one-thousandth foot is registered, the one tooth or point on the disk 20 will engage one tooth on the ten-toothed wheel or disk 21, secured on the sleeve 16, and cause it to turn one-tenth of a revolution. The dial 37, secured on the sleeve 16, will at the same time turn one-tenth of a revolution and show at the opening 26 in the dial 24 the figure "1." The thousands up to nine will be registered in this opening 26 in the dial 24. Ten thousand and its multiples up to ninety will be registered in a similar manner by a small dial 37, secured on the sleeve 15 at the opening 25 in the face of the dial 24. It is apparent that when a number—as, for example, ninety-nine thousand nine hundred and ninety-nine—is registered the figure "9" will appear at the opening 25, "9" at the opening 26, "9" at the opening 27, and the indicator 30 will stand at "99" on the edge of the dial 24. It is also apparent that when the one-hundred-thousandth foot is registered each of the openings 25, 26, and 27 will show "0," and the indicator 30 will stand at "0" on the dial 24.

From the foregoing description it is obvious that should it be desired to register a greater number than ten at one time—as, for example, nineteen—the hand or pointer 4 must be moved first to the number "10" on the scale 3, then allowed to return to its normal position at "0," and then moved to the number "9" on said scale.

Although we have described more or less precise forms and details of construction, it is understood that changes in form and the minor details of construction may be resorted to without departing from the spirit or scope of our invention and without sacrificing any of the advantages thereof.

Having thus described our invention, what we claim as new, and desire to secure by Letters Patent, is—

1. In a registering device, the combination with the casing having an extension on the base-plate thereof provided with a graduated scale, of the registering mechanism mounted therein, consisting of a series of registering-dials, actuating mechanism for said registering-dials, said actuating mechanism consisting of a hand or pointer provided with spring-controlled pawls in engagement with a circular notched or ratchet-toothed rotatable disk, and actuating said ratchet-toothed rotatable disk to move as it is being moved along the graduated scale of the extension of the base-plate, said disk being provided with an indicator on its edge which projects upward and outward over the face of the device, and intermediate mechanism between said disk and the registering-dials, substantially as and for the purposes set forth and described.

2. The combination with the casing having a base-plate provided with an extension, said extension having an upward and backward bend at its forward end and a graduated scale on said end, of the large circular dial having openings in its face, the registering-dials actuated to turn by a series of wheels or disks, said wheels or disks actuated by a stud carried by a large circular notched or ratchet-toothed rotatable disk, said large disk actuated to rotate by a movable hand or pointer loosely pivoted and arranged to be moved along the graduated scale on the extension of the base-plate, substantially as described.

3. In a registering device substantially as described, the combination of the casing having an extension on its base-plate which is provided with a graduated scale on its end, the movable hand or pointer provided with a spring carrying teeth or pawls designed to engage the notches or teeth in a large circular notched or ratchet-toothed rotatable disk as the hand or pointer is being moved forward along the graduated scale of the extension of the base-plate, said notched or ratchet-toothed rotatable disk mounted upon a post or axis and carrying a stud and also an indicator, said stud projecting upward through an endless slot and outward over the edge of a large registering-dial, the stationary plate supporting two upright posts, said posts provided with sleeves which have secured thereon a series of wheels or disks, the stud carried by the large circular disk adapted to engage successively the teeth on one of said series of wheels or disks, the small registering-dials secured on the sleeves of the upright posts, the large circular dial provided with a graduated scale around the edge thereof and having openings in its face, substantially as and for the purposes set forth and described.

4. In a registering device, the combination with a circular casing, of a base-plate having an extension the end of which has an upward and backward bend provided with a graduated scale, a movable hand or pointer mounted upon an axis at the center of the circular portion of the base-plate, a spring actuating said hand or pointer to return to its normal position, a circular notched or ratchet-toothed rotatable disk arranged to be moved forward with the hand or pointer by means of teeth or pawls secured at each end of a spring carried by said hand or pointer, and prevented from retrograding with said hand or pointer by a spring-controlled pawl secured to the inner side of the casing, an indicator secured on the edge of the large rotatable disk and projecting upward through an endless slot in the face and outward over the edge of the dial, a circular dial provided with a graduated scale and having three openings in its face, and intermediate mechanism between said large rotatable disk and the large circular dial, substantially as and for the purposes set forth and described.

5. A registering device substantially as described, comprising a casing having an extension on its base-plate which is provided with a graduated scale on its end, a base-plate provided with a post or axis projecting upward from the center of the circular portion thereof, said post or axis having loosely pivoted thereon a circular notched or ratchet-toothed rotatable disk, means for rotating said disk as a hand or pointer secured on said post or axis is being moved forward along the graduated scale of the extension of the base-plate, a stationary plate above said disk, said plate provided with two upright posts or axes, rotatable sleeves on said posts or axes and upon that part of the first-named post or axis which extends above said stationary plate, a dial on each of these sleeves provided with a circular scale, a large dial above the small dials, said large dial having three small openings in its face through which the numbers on the small dials show as registered, substantially as described.

Signed by us at Parkersburg, West Virginia, this 12th day of November, 1898.

EMERY F. COLLINS.
WILLIAM B. COLLINS.

Witnesses:
J. W. MARTIN,
C. A. SMITH.